June 30, 1970     H. BRUECKMANN     3,518,684
DUPLEX ANTENNA SYSTEMS FOR AIRCRAFT TRANSCEIVERS
Filed Feb. 20, 1968
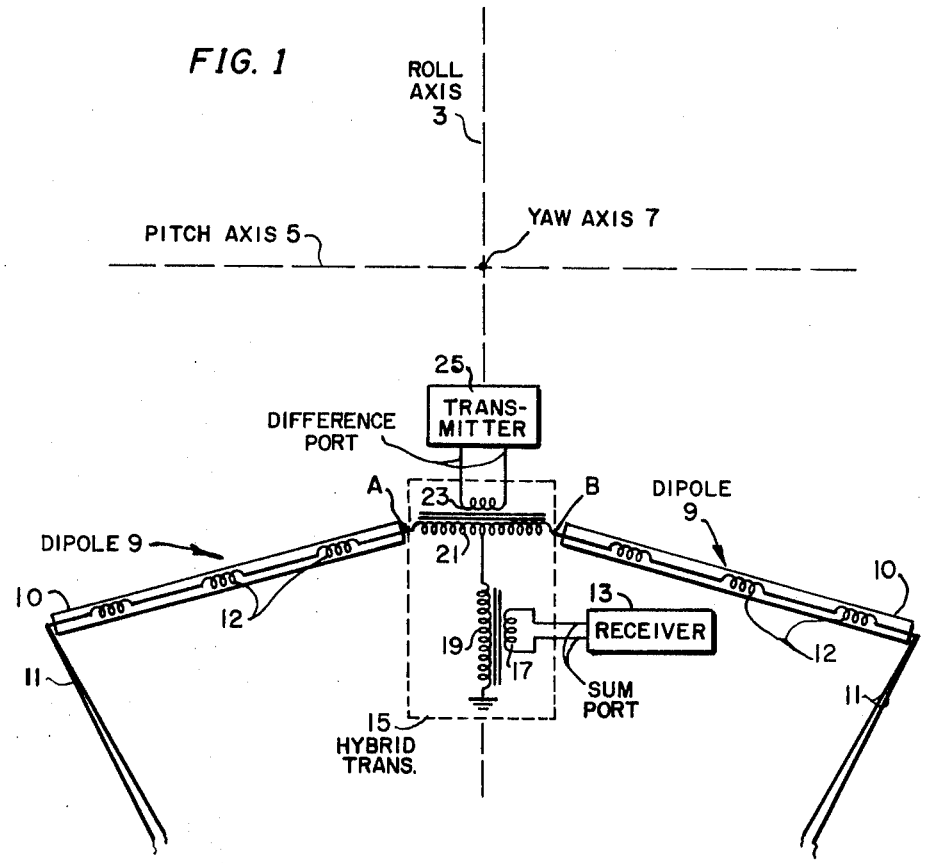
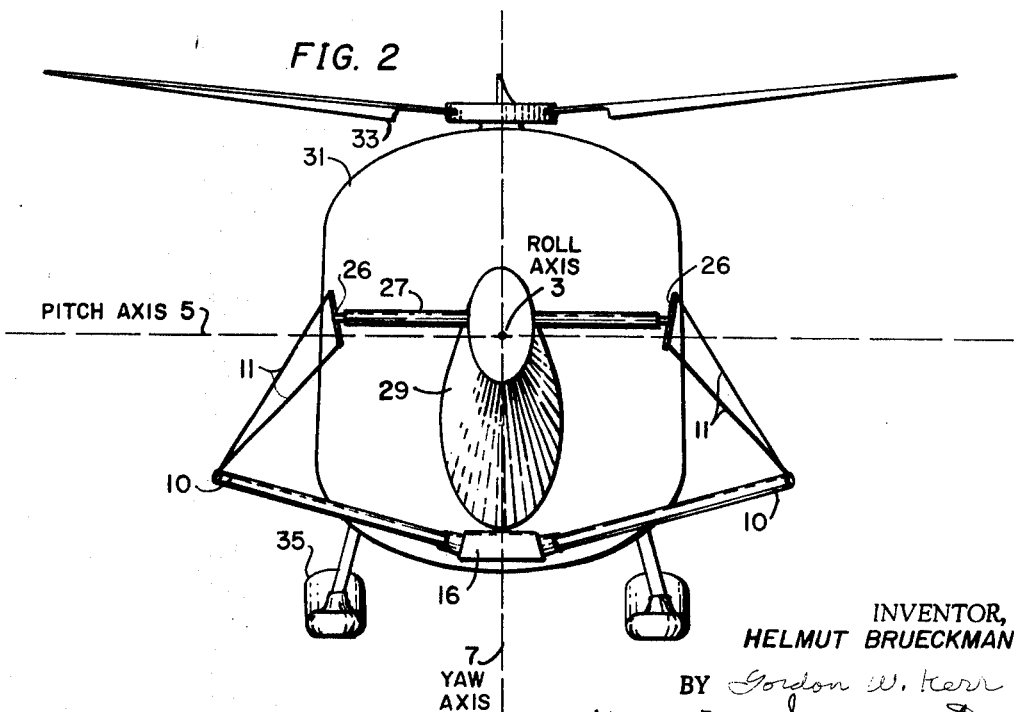
INVENTOR,
HELMUT BRUECKMANN.
BY Gordon W. Kerr
Harry M. Saragovitz
Edward J. Kelly & Herbert Berl
ATTORNEYS.

United States Patent Office 3,518,684
Patented June 30, 1970

3,518,684
DUPLEX ANTENNA SYSTEMS FOR AIRCRAFT TRANSCEIVERS
Helmut Brueckmann, Little Silver, N.J., assignor to the United States of America as represented by the Secretary of the Army
Filed Feb. 20, 1968, Ser. No. 706,811
Int. Cl. H01q 1/28, 1/52
U.S. Cl. 343—705                      6 Claims

ABSTRACT OF THE DISCLOSURE

This antenna system comprises a V-shaped dipole extending outwardly from either side of the aircraft. The dipole elements are provided with series loading coils. Wires extend from the ends of the dipole rearwards toward the aircraft tail. The antenna is connected to a transmitter via the difference port of a hybrid transformer and to a receiver via the sum port thereof. The wires provide capacitive end-loading for the dipole and also serve as signal pickup means for the receiver. The hybrid provides isolation between the transmitter and receiver, permitting simultaneous operation thereof.

---

The present invention relates to antenna systems particularly adapted for use on aircraft in which a plurality of transmitters and receivers are required to be operated simultaneously. These transmitters and receivers may be parts of an airborne communications relay station operating in the high frequency (HF) region of the spectrum or navigational equipment which is usually operated at the higher frequencies of the VHF or UHF region. The trend in voice communications systems is toward full duplex operation wherein both parties to a conversation may talk simultaneously. Such a system requires the use of antenna systems which will not permit a strong transmitted signal to interfere with the simultaneous reception of weak signals. Further, prior art antennas used for transmitting in the HF region from medium-sized aircraft usually excite the entire aircraft body, since the aircraft dimensions are in the vicinity of a half wavelength at such frequencies, and half wavelength antennas are highly efficient. In such case the so-called antenna is merely a means for coupling the transmitter energy to the aircraft body. Thus the radiation pattern of such a system is a function of both the frequency of operation and the geometry of the aircraft and will in general exhibit deep, and unpredictable nulls which will vary with the operating frequency. The excitation of the entire aircraft immerses it in a strong field which interferes with simultaneously operating receivers and transmitters even though they are tuned to different frequencies and are electrically isolated from the aircraft body. The present invention overcomes these difficulties by providing a novel antenna system for each pair of transceivers aboard the aircraft, each said system comprising a pair of radiating elements symmetrically disposed on opposite sides of the plane defined by the roll and yaw axes of the aircraft. This is the vertical plane which bisects the aircraft lengthwise if it is in level flight. For isolation purposes, the transmitter and receiver are coupled to this antenna system via a hybrid transformer. The result is that the radiating elements on either side of the craft are fed in a balanced or anti-phase mode with respect to the transmitter and in an unbalanced or co-phasal mode with respect to the receiver. This arrangement reduces or eliminates the excitation of the aircraft body by the transmitter, since the body is located in an electrically neutral region between the balanced radiation elements. The radiating elements resemble a dipole with series loading coils in the arms thereof and capacitive loading wires connected to the ends thereof. The radiating elements and loading wires are not co-linear, the dipole elements forming a shallow V with the loading wires swept back sharply from the ends of the V. This structure results in a transmitter radiation pattern with shallower nulls than would result from a co-linear dipole. The connection of the receiver to the antenna through the hybrid circuit is such that most of the signal reception is due to the loading wires.

It is thus an object of the invention to provide an aircraft antenna system which may be used simultaneously for transmitting and receiving and wherein the transmitted energy will not cause interference with other equipment on board the aircraft.

Another object of the invention is to provide an aircraft antenna for the high frequency region which has a predictable radiation pattern which is nearly independent of both aircraft geometry and operating frequency.

A further object of the invention is to provide an efficient antenna system for use by helicopters and other medium-sized aircraft which are used as airborne communications relay stations.

Another object of the invention is to provide an antenna comprising two symmetrical radiators which can be excited simultaneously in a balanced and unbalanced manner.

A further object of the invention is to provide an aircraft antenna which when fed by a transmitter in a balanced mode will not excite resonances in the aircraft body, and when fed in an unbalanced mode will permit reception of signals in the high frequency and very high frequency regions.

Yet another object of the invention is to provide an aircraft antenna which can be simultaneously connected to a transmitter and receiver and wherein the transmitter signal will not interfere with the simultaneous reception of weak signals.

These and other objects of the invention will become apparent from the following detailed description and drawings, in which:

FIG. 1 is a schematic diagram of a top view of an antenna system constructed according to the present invention, shown in relation to the three mutually perpendicular axes of an aircraft on which the antenna may be mounted.

FIG. 2 is a pictorial view of the antenna system of FIG. 1 mounted on a helicopter.

In the diagram of FIG. 1, the three aircraft axes, roll, pitch and yaw are labelled 3, 5 and 7 respectively. The aircraft is not shown in this view to more clearly illustrate the antenna circuitry, however the nose of the craft would be located at the top of this diagram along the roll axis and the tail at the bottom along the same axis. Thus the structure of FIG. 1 is viewed from above the aircraft. The antenna system comprises a pair of radiating elements 9, which together form a V-shaped dipole extending symmetrically on either side of the plane containing the roll and yaw axes. Thus the dipole arms or elements extend symmetrically outward on either side of the aircraft body or fuselage. The dipole elements form a shallow V and the plane of the V is inclined to the plane containing the pitch and roll axes in such a way that the radiating elements 9 are swept both backward and upward. The backward sweep is apparent in FIG. 1 and the upward sweep in FIG. 2. The dipole elements 9 are supported within a pair of hollow fiberglass or dielectric tubes 10. In order to reduce the physical length relative to the electrical length, the dipole elements are each provided with a plurality of loading coils 12. These coils may comprise toroidal ferrite cores with a plurality of turns wound thereon. Each of the outer extremities of the dipole has a pair of wires attached thereto which extend back toward the tail of the aircraft. These wires 11 are approximately perpendicular to the dipole elements and are therefore approximately parallel to the aircraft body. These wires perform a dual function. They provide capacitive end-loading for the dipole when fed in the balanced mode and they comprise a substantially parallel array of straight wire radiators when fed in a co-phasal or unbalanced mode. The antenna system of FIG. 1 is coupled to a transmitter 25 and a receiver 13 via a hybrid transformer 15, the entire circuitry forming one terminal of a high frequency duplex communication system. The transmitter is connected to the difference port comprising winding 23 and the receiver to the sum port comprising winding 17. Winding 17 is magnetically coupled to winding 19, one end of which is grounded to the conductive aircraft body and the other end of which is connected to the center tap of winding 21. The opposite ends of winding 21 form the A and B ports or terminals of the hybrid, to which the dipole elements are connected. The winding 23 is magnetically linked to winding 21 symmetrically on either side of the center tap thereof. It can be seen that with this circuitry the transmitter output will produce voltages of equal amplitude but opposite polarity on the two halves of the dipole to provide balanced excitation thereof. Since the aircraft body is located relative to the antenna halfway between points of equal and opposite transmitter voltage, little or no excitation by the transmitter of the aircraft body will result, and the transmitter radiation pattern will be determined mostly by the antenna characteristics rather than the geometry of the aircraft body. The lack of body excitation also reduces interference with other equipment, as noted above. A co-linear or straight dipole has a figure 8 radiation pattern with the two nulls thereof along the line of the dipole. The V-shaded dipole of the present invention has a modified figure 8 pattern with less severe nulls broadside of the aircraft. Thus while the transmitter radiation pattern of the present invention is not omnidirectional in the horizontal plane it has some radiation in all directions.

It can be seen that the sum port of the hybrid to which the receiver 13 is connected will excite the two halves of the antenna with co-phasal voltages in an unbalanced mode. A straight dipole will exhibit poor radiation efficiency and pattern when fed in such a manner, however the illustrated antenna is capable of both radiation and reception when so fed due both to the fact that the dipoles are V shaped and due to the wires 11, which are substantially parallel to each other and hence will function as a co-phasally fed array, with the aircraft body as the counterpoise or ground. The radiation pattern of the antenna system in the unbalanced or receive mode in the horizontal plane for horizontal polarization will also be a modified figure 8, as in the transmit mode, however the nulls thereof will be shifted by 90°, so that the pattern lobes are directed to the port and starboard sides, whereas the lobes in the transmit mode are directed ahead and astern of the aircraft.

It is true that in the receive mode the aircraft is not in a neutral electrical plane with respect to the antenna and thus aircraft body excitation and resonances may result from received signals. This however will not cause any difficulty or interference because the strength of the received signals is many orders of magnitude below those of transmitted signals. Also, the body excitation in the receive mode may cause the radiation pattern to depart somewhat from the modified figure 8 shape.

It can be seen that there will be no transfer of energy from the transmitter 25 to the receiver 13 via the hybrid circuit, since the sum and difference ports thereof are isolated from each other. The voltages induced in winding 21 by the transmitter output are balanced with respect to the center tap thereof, so no current will flow to ground through winding 19. Conversely, any currents due to received signals which flow from the antenna elements toward the center tap will flow to ground through winding 19 and appear at the sum port, but will produce no net voltage across either windings 21 or 23. Due to this isolation of the transmitter and receiver and the decoupling of the transmitter from the aircraft body, the antenna may be used simultaneously for transmitting and receiving and further, other similar high frequency antennas and their associated transmitters and receivers, as well as higher frequency navigation equipment may be also operated simultaneously with a minimum of interference. Isolation between a transmitter and a receiver can be achieved by the use of a filter between the antenna and the receiver, the filter being tuned to reject the transmitter frequency, however a filter capable of handling the voltage and power applied thereto from the transmitter would be costly, bulky and impractical for aircraft use. A hybrid can provide up to 40 db isolation between its sum and difference ports. In most cases this will be sufficient isolation, however, if it is not, additional isolation can be provided by a filter between the sum port and the receiver. This filter need be capable of handling only small amounts of power and thus can be made compact and lightweight.

FIG. 2 is a pictorial rear view of a helicopter with the antenna of FIG. 1 mounted thereon. The helicopter includes a main body section 31 with a tail boom 29 extending rearwardly thereof, and a main rotor 33. The landing skids are shown at 35. The helicopter's tail rotor is not shown, so that the antenna structure can be more clearly illustrated. The three axes are indicated by the same reference numerals as in FIG. 1. The dielectric tubes 10 containing the dipole 9 are shown projecting from either side of an enclosure 16 which is mounted on the underside of the craft symmetrically on either side of the roll-yaw plane. The enclosure, in addition to supporting the antenna, may contain the hybrid transformer, the transmitter and receiver. The wires 11 extend backward from the outer ends of the dipole and are supported by insulated brackets 26 which are in turn attached to the outer ends of the horizontal stabilizer 27.

The disclosed antenna is not limited to use in the high frequency band or on helicopters, as illustrated. A similar antenna could be used in the VHF band, especially in the lower regions thereof where an aircraft body or portions thereof may have dimensions equal to half of the transmitted wavelength, or odd multiples thereof.

While the invention has been illustrated in connection with a single embodment, the inventive concepts inherent therein are of general application, hence the invention should be limited only by the scope of the appended claims.

What is claimed is:

1. An antenna system for a high frequency transceiver comprising a V-shaped dipole extending outwardly and symmetrically from either side of an aircraft body, a plurality of loading wires extending from either end of sad dipole substantially parallel to said aircraft body, a transmitter and a receiver, means to feed said antenna system in a balanced or anti-phase mode with respect to said transmitter and simultaneously in an unbalanced or co-phasal mode with respect to said receiver.

2. The antenna system of claim 1 wherein said means comprise a hybrid transformer with said transmitter connected to the difference port thereof, said receiver connected to the sum port thereof, and said dipole connected to the A and B ports thereof.

3. The antenna system of claim 2 wherein said dipole includes series loading coils.

4. The antenna system of claim 3 wherein said dipole and its said loading coils are supported within hollow dielectric tubes.

5. An antenna system for an airborne transceiver comprising, an aircraft, a V-shaped dipole extending symmetrically on either side of the plane containing the roll and yaw axes of said aircraft, loading wires attached to the ends of said dipole and extending substantially parallel to said plane, a transmitter and receiver, means to feed said dipole in a balanced or anti-phase mode with respect to said transmitter and in an unbalanced or cophasal mode with respect to said receiver.

6. The system of claim 5 wherein said means comprise a hybrid transformer.

References Cited

UNITED STATES PATENTS

| | | | |
|---|---|---|---|
| Re. 19,854 | 2/1936 | Amy et al. | 343—730 |
| 1,523,280 | 1/1925 | Palmer | 343—724 |

OTHER REFERENCES

Pascalar, H. G., "Strip Line Hybrid Junction," IRE Trans. on Microwave Theory and Techniques, January 1957, pp. 23–30.

Fortescue, C. L., "Wireless Telegraphy," Ch. XI, pp. 120-124.

HERMAN KARL SAALBACH, Primary Examiner

W. H. PUNTER, Assistant Examiner

U.S. Cl. X.R.

343—724, 730, 858